United States Patent
Maclean et al.

(10) Patent No.: US 7,072,961 B1
(45) Date of Patent: Jul. 4, 2006

(54) DATA SESSION SERVICE INITIALIZATION FOR WIRELESS DEVICES

(75) Inventors: Ian Maclean, Dallas, TX (US); Gokul Subramaniam, Dallas, TX (US)

(73) Assignee: Nortel Networks Limited, St. Laurent (CA)

(*) Notice: Subject to any disclaimer, the term of this patent is extended or adjusted under 35 U.S.C. 154(b) by 626 days.

(21) Appl. No.: 10/036,084

(22) Filed: Dec. 31, 2001

Related U.S. Application Data

(60) Provisional application No. 60/290,744, filed on May 14, 2001.

(51) Int. Cl.
*G06F 15/16* (2006.01)

(52) U.S. Cl. .................................... 709/224; 370/353
(58) Field of Classification Search ................ 709/224, 709/235; 370/252, 353
See application file for complete search history.

(56) References Cited

U.S. PATENT DOCUMENTS

| | | | |
|---|---|---|---|
| 6,608,832 B1* | 8/2003 | Forslow | 370/353 |
| 6,636,502 B1* | 10/2003 | Lager et al. | 370/352 |
| 6,690,929 B1* | 2/2004 | Yeh | 455/406 |
| 6,748,434 B1* | 6/2004 | Kavanagh | 709/224 |
| 6,807,156 B1* | 10/2004 | Veres et al. | 370/252 |
| 2002/0082023 A1* | 6/2002 | Bark et al. | 455/453 |

* cited by examiner

*Primary Examiner*—Andrew Caldwell
*Assistant Examiner*—Stephan Willett
(74) *Attorney, Agent, or Firm*—Garlick Harrison & Markison, LLP; James A. Harrison

(57) ABSTRACT

A system and method of the present invention include a gateway device that serves as an interface between a high speed wireless data packet network and an application server placed within a wireline data packet network such as the Internet. The gateway device generates network performance indicators that reflect performance of the high speed wireless data packet network and transmits them to an application server. This enables the quality of service determinations to be made by the application server with at least some knowledge of the wireless network's ability to support the selected quality of service. In the described embodiment of the invention, the gateway devices are GPRS/UMTS gateway GPRS support nodes (GGSNs). The GGSNs generate network performance indicators.

20 Claims, 3 Drawing Sheets

DATA SESSION SERVICE INITIALIZATION FOR WIRELESS DEVICES

This application claims the benefit of Provisional Application No. 60/290,744, filed May 14, 2001.

BACKGROUND OF THE INVENTION

1. Technical Field

The present invention relates generally to mobile communication systems and, more particularly, to high speed data packet networks for delivering data to mobile terminals.

2. Description of the Related Art

The general packet radio service (GPRS) is a non-voice value added service that allows information to be sent and received across a mobile telephone network. It supplements, or rides on top of, today's circuit switched data and short message service (SMS) networks. The theoretical maximum speed of GPRS systems includes speeds of up to approximately 171.2 kilobits per second (Kbps). This maximum speed is achievable in GPRS systems using all eight timeslots at the same time in a time division multiple access (TDMA) context.

This speed is about three times as fast as data transmission speeds possible over today's fixed telecommunication networks and ten times as fast as current circuit switched data networks on Global System for Mobile Communications (GSM) standard TDMA networks. Thus, GPRS systems are advantageous in that they require less system resources to transmit a fixed amount of data in comparison to using a traditional circuit switched approach. By allowing information to be transmitted more quickly, immediately, and efficiently across the mobile network, GPRS may well be a relatively less costly mobile data service compared to short message service and circuit switched data networks.

General packet radio service also facilitates instant connections in which information can be sent or received immediately as the need arises, subject to radio coverage. No dial-up modem connection is necessary. GPRS, similar to some broadband connections for personal computers, is often referred to as being "always connected". Thus, another one of the advantages of GPRS is that data may be transmitted immediately, whenever the need arises. In contrast to circuit switched data networks in which a connection must be established to transmit a data packet or data file, GPRS operation is extremely efficient in those situations in which a small amount of data is to be sent.

The emphasis of many designs today are to create wireless computer networks and to connect data devices, including personal computers to wireless transceivers and mobile terminals. A system that provides instantaneous response is very important for time critical applications and, more generally, for the implementation of wireless computer networks.

For example, a remote credit card authorization system implemented in a wireless network can be greatly improved if it is unnecessary for the customer to wait the amount of time that is required to establish a connection. Anyone that has waited at a cash register for credit authorization while a modem dials in and transmits account information can readily appreciate this advantage.

Additionally, GPRS facilitates the use of Internet applications not only from personal computers, but also from appliances and machines. It is anticipated that appliances will be designed to be coupled to the Internet to facilitate control either onsite or remotely. While some people envision connecting these appliances to a network port by physical lines, it would clearly be advantageous to be able to connect such appliances to the Internet through a wireless link. GPRS will facilitate the creation of Internet controlled appliance networks through a wireless medium.

As suggested before, GPRS involves overlaying a packet based air interface on an existing circuit switched wireless network. For example, the circuit switched wireless network may comprise a GSM network. Accordingly, the user is given an option to utilize a packet-based data service. In order to overlay a packet-based air interface over a circuit switched network, the GPRS standard defines new infrastructure nodes to minimize the impact to existing networks in terms of hardware and software.

Other packet-based systems are being developed for delivering data to wireless terminals. For example, universal mobile telecommunications systems (UMTS) are being developed to provide the benefits of GPRS with added benefits, including faster speeds and greater throughput. While GPRS systems have been developed to supplement and enhance existing voice based wireless communication networks, UMTS networks are new and are expected to be launched in the near future.

Another advantage of high speed data networks such as GPRS and UMTS is that the packet switching that results from the infrastructure nodes allows the use of GPRS radio resources only when users actually are sending or receiving data. Unlike traditional circuit switched voice networks, a connection is not continuously reserved for a user for the intermittent transmission of data. This efficient use of scarce radio resources means that a larger number of GPRS users can share the same bandwidth and be served from a single base station or cell. The actual number of users that may use the system at one time, of course, depends on the amount of data being transferred.

One problem that the inventors have realized with respect to high speed GPRS/UMTS networks relates to the interaction of a gateway GPRS support node (GGSN) and the various application servers that deliver data to wireless terminals through the data packet network, such as the Internet, and the wireless high speed data packet networks such as GPRS/UMTS. Typically, a gateway GPRS support node (GGSN) communicates with the application servers by way of the Internet and provides the gateway functionality to the GPRS/UMTS networks. There is a need, therefore, for a system and method that enables the network, and more specifically, the application servers that are external to the high speed wireless networks, to more intelligently assign a quality of service rating for a given session to reduce overloading and improve network performance.

The inventors have realized that the external application servers make quality of service determinations based upon the service level agreements with users but do not account for network conditions in the high speed wireless data packet networks, such as GPRS/UMTS networks. Accordingly, the application servers may waste resources by attempting to provide a quality of service that cannot be supported by the GPRS/UMTS networks.

SUMMARY OF THE INVENTION

A system and method of the present invention include a gateway device that serves as an interface between a high speed wireless data packet network and an application server placed within a wireline data packet network, such as the Internet, wherein the gateway device generates network performance indicators that reflect performance of the high speed wireless data packet network. The gateway device transmits the high speed wireless data packet network indicators to the application server so that quality of service determinations are made by the application server with at least some knowledge of the high speed wireless data packet network's ability to support the selected quality of service. In the described embodiment of the invention, the gateway devices are GPRS/UMTS network GGSNs. The GGSNs generate network performance indicators that reflect network performance for the high speed wireless data network that are transmitted to the external application server.

In an alternate embodiment, however, a request signal is generated by the GGSN to request that the present quality of service either be increased or decreased. For this embodiment, the request signal may be implemented in a manner similar to power control arrangements for code division multiple access (CDMA) networks in which power up and power down commands are continuously issued so as to minimize forward link transmission power while keeping the signal quality or error rate at a specified value.

In the described embodiments of the invention, the network performance indicators are generated and produced to the application server at the initialization of a data session. The network performance indicators then, in a variation of the described embodiment, are transmitted by the GGSN to the application server either on a periodic basis or whenever network conditions change by a defined amount. Thus, the application server is able to adjust the quality of service being provided not only to match the service level agreement for the user of the mobile terminal that is to receive the data, but also to match network conditions of the high speed wireless data packet network (GPRS/UMTS in the described embodiment). Accordingly, network resources are not needlessly wasted by having the application server and the wireline data packet service provide a quality of service that is not deliverable to the wireless mobile terminal.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
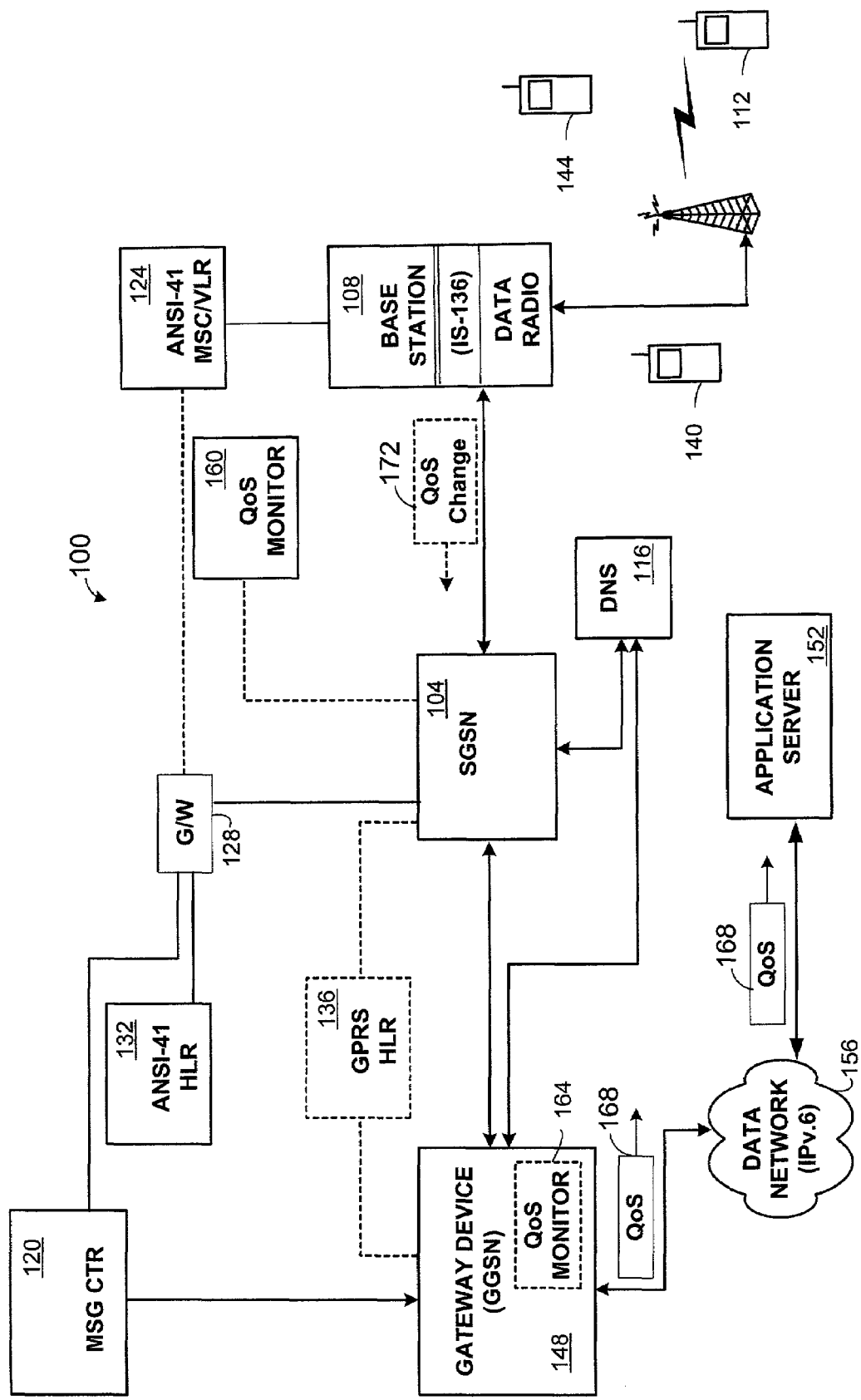
FIG. 1 is a functional block diagram illustrating a GPRS network that can provide network performance indicators to an application server according to one embodiment of the present invention.

FIG. 1 is a functional block diagram illustrating a GPRS network that can provide network performance indicators to an application server according to one embodiment of the present invention. A GPRS network 100 includes an SGSN 104 that is coupled to a plurality of network elements, including a base station 108 that communicates with a mobile terminal 112. Base station 108 includes an GSM radio for transmitting and receiving voice communications with mobile terminal 112, as well as a radio for transmitting and receiving data packets from mobile terminal 112. It is understood that mobile terminal 112 may be a voice radio, a data transceiver, or a combination of both.

SGSN 104 also is coupled to a domain name server (DNS) 116 as is a GGSN 148. Domain name servers convert domain names into IP addresses consisting of a string of numbers. Thus, SGSN 104 communicates with DNS 116 when mobile terminal 112 is initiating a data session with a device coupled to the Internet. The DNS finds the appropriate GGSN that is to serve as a Gateway to the mobile terminal 112.

A message center 120 is coupled to communicate through a gateway 128 with SGSN 104, as well as with an GSM mobile switching center/visitor location register (MSC/VLR) 124. MSC/VLR 124 also is coupled to base station 108 to provide routing and traditional visitor location register information as needed by base station 108. Operation of GSM MSC/VLR 124 is well known in the art. Additionally, message center 120 is coupled to communicate with gateway 128 that, in turn, is coupled to communicate with a GSM home location register (HLR) 132. GSM HLR 132 is for providing home location register information in support of voice communications for mobile terminal 112. HLR 132, in the described embodiment, provides support for GSM networks as well as for the wireless data packet networks. It is understood, however, that separate HLRs may be used. For example, an HLR 132 may be used for the wireline telephony networks and an HLR 136 may be used for the wireless data packet network. In the described embodiment, one HLR, e.g., HLR 132 is used to provide HLR type functionality for both the GSM and the wireless data packet network.

As has been described elsewhere, the present GPRS network is an overlay network, meaning that it is attached to existing networks to provide the GPRS capability. Accordingly, GPRS network 100 of FIG. 1 includes traditional voice or circuit switched network elements, such as GSM HLR 132. Alternatively, as described above, the network can includes an HLR 136 that is coupled to SGSN 104 and that is for providing HLR functionality to the wireless data packet network. In this example, HLR 136 provides HLR information for mobile terminals that comprise, at least in part, edge data radio circuitry. Thus, if a mobile terminal is strictly an GSM radio, while mobile terminal 112 includes GSM, as well as edge data radio circuitry, and a mobile terminal 140 is purely an edge data radio, then GSM HLR 132 and HLR 136 will have different roles with respect to providing HLR data. GSM HLR 132 will provide mobile terminal data for mobile terminals 112 and 140, while HLR 136 will provide mobile terminal data for mobile terminal 112 and a mobile terminal 144. Both GSM HLR 132 and HLR 136 may provide data for mobile 112 since it has GSM and edge data capability.

As may be seen, however, system operation would be simpler if only one HLR were to provide HLR functionality for both the telephony and wireless data packet networks.

As may also be seen, SGSN 104 is coupled to GGSN 148 that is coupled to application server 152 by way of a data network 156. In the described embodiment, data network 156 is an Ipv.4 or an IPv.6 network. Older versions (as well as future versions) of the Internet may also be used herein. GGSN 148 provides gateway functionality between SGSN 104 and data network 156. SGSN 104 also is shown to be coupled to a QoS monitor 160. QoS monitor 160 evaluates network conditions such as congestion, jitter, delay, etc. in order to determine the health and capacity of the network. While the example shows a QoS monitor 160 that is coupled to SGSN 104, it is understood that QoS monitor 160 is coupled to receive data from each of the network elements of the high speed wireless data packet network and is able to communicate with each. All of the connections are not shown for simplicity. In operation, therefore, QoS monitor 160 generates network performance indicators to the various GGSNs of the high speed wireless data packet network, including GGSN 148.

As may also be seen, GGSN 148 optionally includes a QoS monitoring circuitry 164 for determining network performance. QoS monitoring circuitry 164 is shown in dashed lines in FIG. 1 as it illustrates an alternate embodiment of the invention. With QoS monitoring circuitry 164, GGSN 148 is able to determine the values of the network performance parameters rather than have to wait for such values from another system.

Continuing to refer to FIG. 1, GGSN 148 generates a network performance indicator signal 168 that it transmits to application server 152 by way of data network 156. In the described embodiment of the invention, network performance indicator signal 168 includes parameters that define commonly measured network performance indicators, including jitter, throughput, congestion, delay, etc.

In an alternate embodiment of the invention, a system within the network makes determinations regarding whether the QoS of a data stream being produced by an application server, e.g., application server 152, should be increased or decreased. Such a determination may be made by any one of several different devices or systems. In the described embodiment, mobile terminal 112 makes such determinations. Accordingly, and as may be seen, a QoS change signal 172 originated by mobile terminal 112 is being transmitted from base station 108 to SGSN 104. In the described embodiment, QoS change signal 172 is transmitted to GGSN 148 within the high speed wireless data packet network and then from GGSN 148 to application server 152 by way of data network 156.

In general, the invention provides a system that allows and application server, for a session being set up, to determine what QoS level was negotiated by the network elements within a wireless data packet network. The wireless data packet networks negotiate a QoS for a session according to the user's service level agreements as well as according to network performance and conditions. Thus, by finding out the negotiated QoS, the application is able to match the negotiated QoS without wasting resources (by transmitting at a QoS level that the wireless data packet network cannot support). Additionally, the need for the application server to perform end-to-end testing to determine network performance is reduced or even eliminated. Finally, the invention accounts for the capability for network elements of the wireless data packet network (e.g., a GGSN) to modify the QoS for an ongoing, by conveying the renegotiated QoS level to the external application server.

Figure 2:
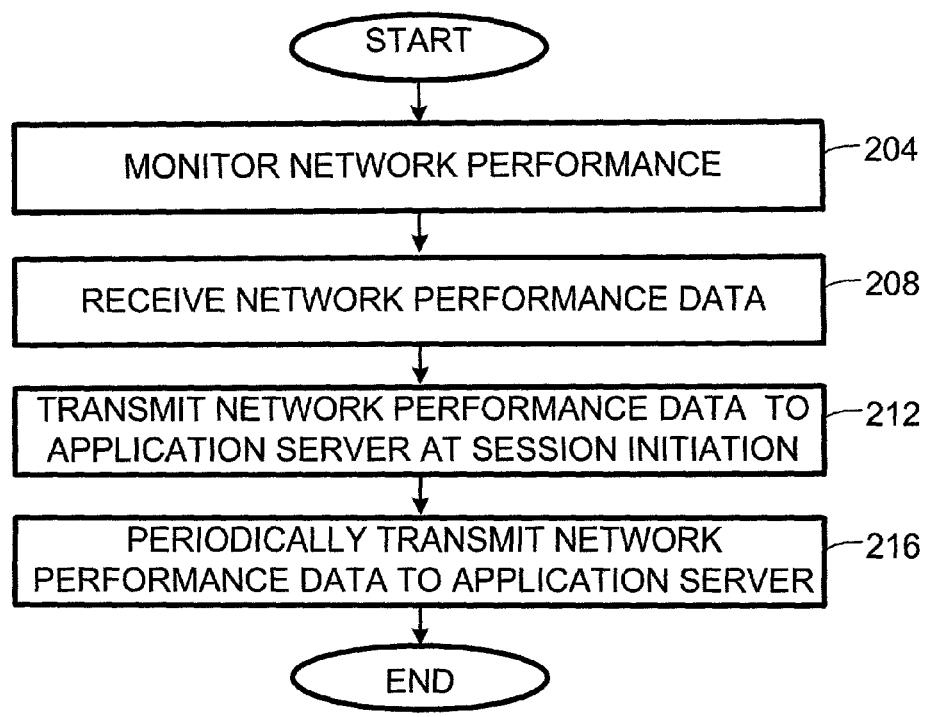
FIG. 2 is a flow chart illustrating a method for transmitting network performance data to an application server according to one embodiment of the present invention.

FIG. 2 is a flow chart illustrating a method for transmitting network performance data to an application server according to one embodiment of the present invention. The first step of the inventive method of FIG. 2 is that the high speed wireless data packet network performance must be monitored (step 204). In the described embodiment of the invention, it is a system external to a gateway device that is monitoring network performance. Thereafter, the gateway device receives network performance data indicators (step 208). The received network performance data indicators include error rates (either bit or frame), amount of jitter, traffic congestion, signal latency, and other commonly monitored signal performance parameters.

Once the gateway device has received the network performance data indicators, it transmits at least some of the received network performance data indicators to an application server with which a session is being established for a mobile terminal (step 212). In the described embodiment, network performance parameters are sent when a session is being established with one of a specified group of application servers. Thus, implicit to this step is determining if the application server is identified or a part of the specified group of application servers. Transmitting the indicators of network performance enables the application server to efficiently transmit at a QoS level that matches that which the high speed wireless data packet network can support. It also enhances user experience by turning off end-to-end testing as a part of adjusting to the negotiated or provided QoS within the wireless data packet network. This optimizes user experience by providing instant stability. Generally, QoS is not wasted if the high speed wireless data packet network cannot support it because of present network conditions. Finally, the invention includes periodically sending updated network performance indicators either on defined time intervals or, alternatively, whenever the network conditions change by a specified degree or amount (step 216).

Figure 3:
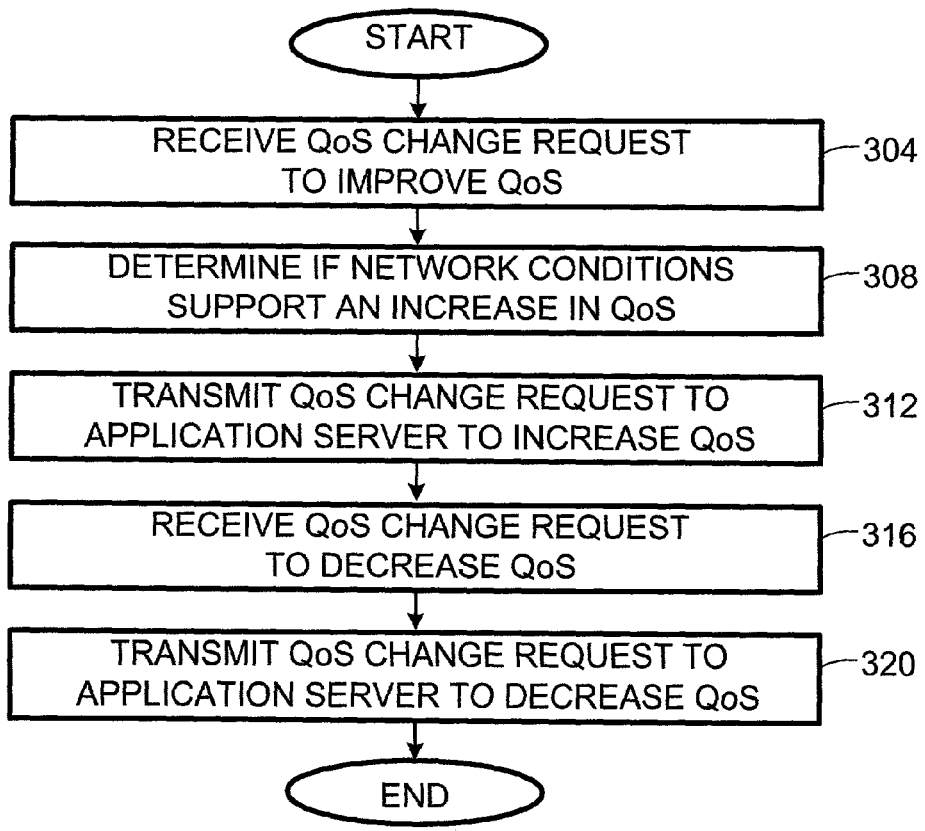
FIG. 3 is a flow chart illustrating a method for adjusting the quality of service provided by an application server according to one embodiment of the present invention.

FIG. 3 is a flow chart illustrating a method for adjusting the quality of service provided by an application server according to one embodiment of the present invention. Referring now to FIG. 3, a gateway device receives a signal from a network element within a high speed wireless data packet network requesting that the QoS is improved (step 304). In the described embodiment, the gateway device only forwards the request if the network conditions allow for the increase in the QoS by the application server. Thus, the next step is to determine if network conditions can support an increase in the QoS (step 308). If network conditions can support the change in the QoS, the gateway device sends a request to the application server that is external to the high speed wireless data packet network asking for the QoS to be increased (step 312). In the described embodiment, the application server examines the request in comparison to a service level agreement defined QoS value for the wireless terminal user. If the QoS can be increased without violating the service level agreement, then it is improved in response to the request.

If a request is received to decrease the QoS, however, the process is simplified. Thus, if the gateway device receives a signal requesting that the QoS be reduced either for an ongoing session or for a session that is being set up (step 316), a QoS change request is transmitted to the application server to reduce the QoS (step 320).

Figure 4:
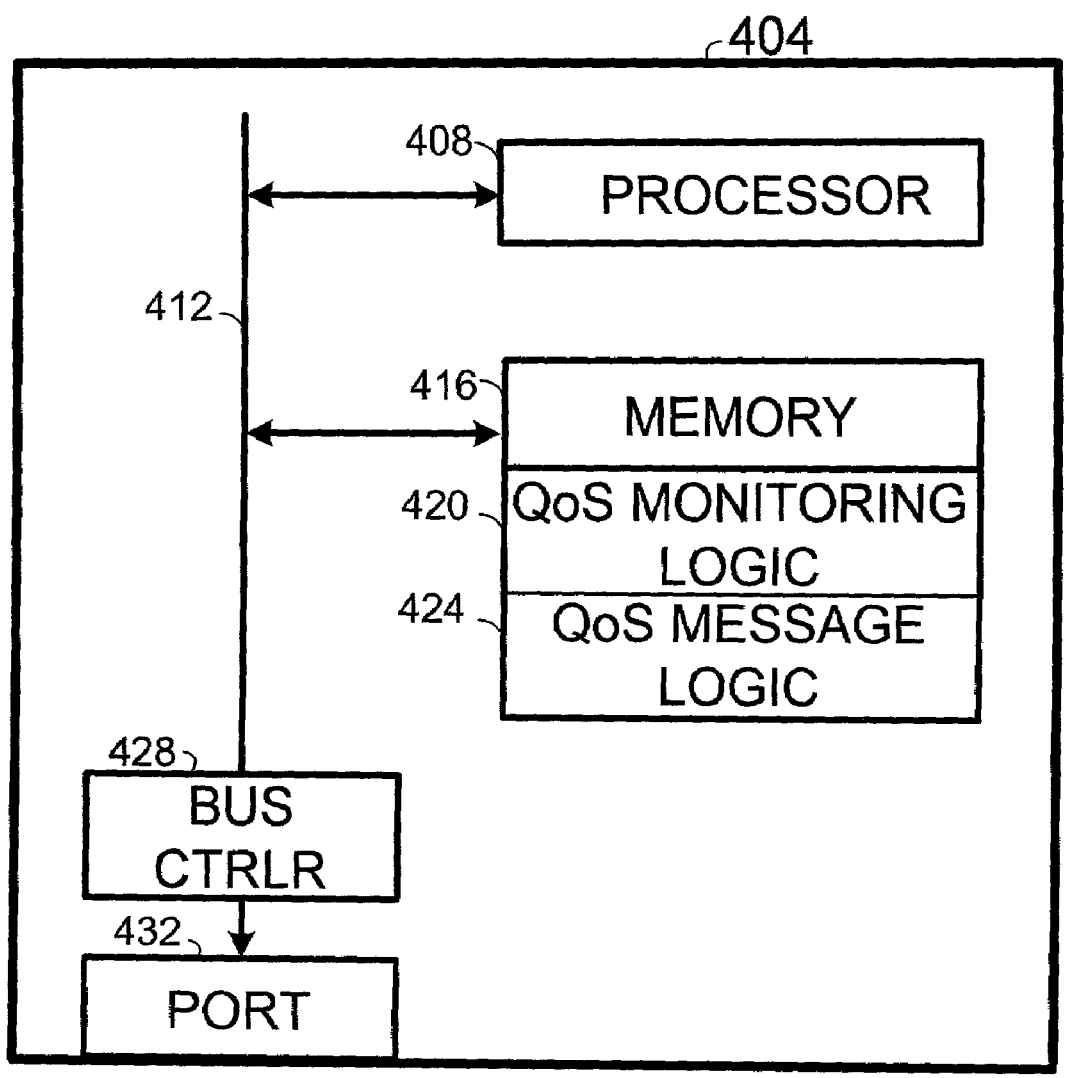
FIG. 4 is a functional block diagram of a gateway device formed according to one embodiment of the present invention.

FIG. 4 is a functional block diagram of a gateway device formed according to one embodiment of the present invention. A gateway device, e.g., a GGSN 404 includes a processor 408 that is coupled to communicate over a bus 412. A memory 416 also is coupled to communicate over bus 412 and includes computer instructions that define the operational logic of GGSN 404. More specifically, memory 416 includes memory portions 420 and 424 that, respectively, include computer instructions that define the logic for monitoring the QoS service within the network. For example, GGSN 148 of FIG. 1 included QoS monitoring circuitry 164. The computer instructions of memory portion 420 define the operational logic that allows GGSN 404 to monitor network operations. Similarly, memory portion 420 includes computer instructions that define the logic for generating a QoS message to an application server as described herein.

Generally, the computer instructions within memory 416 define operational logic that corresponds to the invention as described herein. Thus, processor 408 receives the computer instructions stored in memory 416 by way of bus 412 and executes the computer instructions to achieve the defined logic. Bus 412 further is coupled to a bus controller 428 that controls the communications thereon. Bus controller 428 further is coupled to a network port 432 that is coupled to communicate with external devices.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. For example, the invention described herein may be modified for use in a universal mobile telecommunications system. As may be seen, the described embodiments may be modified in many different ways without departing from the scope or teachings of the invention. For example, any method described herein may be modified to achieve the effect of selecting a GGSN from a plurality of GGSNs according to loading. In one alternate embodiment, GGSNs are selected by having the lowest loading.

The invention claimed is:

1. A high-speed wireless data packet network, comprising:
   an application server for transmitting data to a mobile terminal by way of a wired data packet network and subsequently by way of a wireless communication link; and
   a gateway device providing an interface between the application server and network elements of the high speed wireless data packet network that form the wireless data packet network wherein a gateway general packet radio service (GPRS) service node (GGSN) is formed to pass network performance parameters relating to the wireless data packet network to the application server while a data session is being established to enable the application server to determine an appropriate quality of service (QoS) level of data transfer.

2. The high speed wireless data packet network of claim 1 wherein the network performance parameters include QoS ratings.

3. The high speed wireless data packet network of claim 1 wherein the network performance parameters include an indication of transfer delays being experienced in the network.

4. The high speed wireless data packet network of claim 1 wherein the network performance parameters include an indication of signal data unit error rates being experienced in the network.

5. The high speed wireless data packet network of claim 1 wherein the network performance parameters include an indication of bit error ratios being experienced in the network.

6. The high speed wireless data packet network of claim 1 wherein the network performance parameters include an indication of the amount of jitter being experienced in the network.

7. The high speed wireless data packet network of claim 1 wherein the network performance parameters include an indication of traffic congestion being experienced in the network.

8. The high speed wireless data packet network of claim 1 wherein the network performance parameters include an indication of signal latency being experienced in the network.

9. The high speed wireless data packet network of claim 1 wherein a remote authentication dial-in user service (RADIUS) protocol is used between the GGSN and the application server.

10. The wireless data network of claim 9 wherein the network performance indications are appended on defined RADIUS protocol message extensions.

11. The wireless data network of claim 10 wherein the defined RADIUS protocol message extensions are vendor specific.

12. A gateway general packet radio service (GPRS) support node (GGSN), comprising:
    a processor;
    a memory coupled to communicate with the processor, the memory comprising computer instructions that define logic to prompt the GGSN to transmit wireless network performance indicators to at least one external application server disposed within a wired packet-data network during session setup procedures.

13. The GGSN of claim 12 wherein the computer instructions define logic to prompt the GGSN to generate quality of service (QoS) information to the external application server.

14. The GGSN of claim 12 wherein the computer instructions define logic to prompt the GGSN to transmit the network performance indicators utilizing a remote authentication dial-in user service (RADIUS) protocol wherein the network performance indicators are appended to known RADIUS signals.

15. A method in a gateway general packet radio service (GPRS) support node (GGSN) of transmitting data in a high speed wireless data packet network, comprising:
    determining in the GGSN, network performance characteristics for a wireless network; and
    transmitting from the GGSN network performance indicators to an external application server by way of a packet-data network while a data session is being set up.

16. The method of claim 15 further including the step of transmitting network performance indicators from the GGSN to only to a select group of application servers.

17. The method of claim 15 further including sending the performance indicator periodically from the GGSN if the server is one of a gaming application type server, a multimedia application type server, a streaming media type server, an interactive application type server or a real-time type data server.

18. The method of claim 15 wherein the network performance indicator is a required quality of service (QoS) rating.

19. The method of claim 18 wherein the required QoS rating is increased or decreased according to whether a teal receiving the data from the application server desired to increase or decrease signal quality.

20. The method of claim 18 wherein the network performance indicators are transmitted from the GGSN to enable the application server to evaluate the required QoS to a QoS specified in a service level agreement as a part of determining what QoS should be provided.

* * * * *